US011236629B2

United States Patent
Kusumoto et al.

(10) Patent No.: US 11,236,629 B2
(45) Date of Patent: Feb. 1, 2022

(54) SHROUD ASSEMBLY OF GAS TURBINE

(71) Applicant: KAWASAKI JUKOGYO KABUSHIKI KAISHA, Kobe (JP)

(72) Inventors: Yoshiaki Kusumoto, Kobe (JP); Takeo Nishiura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/092,405

(22) Filed: Nov. 9, 2020

(65) Prior Publication Data
US 2021/0054759 A1    Feb. 25, 2021

Related U.S. Application Data

(63) Continuation of application No. PCT/JP2018/018323, filed on May 11, 2018.

(51) Int. Cl.
| F01D 11/08 | (2006.01) |
| F01D 25/24 | (2006.01) |
| F01D 25/28 | (2006.01) |

(52) U.S. Cl.
CPC .............. F01D 11/08 (2013.01); F01D 25/24 (2013.01); F01D 25/28 (2013.01); *F05D 2220/32* (2013.01); *F05D 2240/11* (2013.01); *F05D 2240/55* (2013.01); *F05D 2300/6033* (2013.01)

(58) Field of Classification Search
CPC .......... F01D 11/08; F01D 25/24; F01D 25/28; F05D 2220/32; F05D 2240/11; F05D 2240/55; F05D 2300/6033
See application file for complete search history.

(56) References Cited

U.S. PATENT DOCUMENTS

| 4,087,199 A  * | 5/1978 | Hemsworth ............ F01D 11/08 |
| | | 415/173.3 |
| 7,044,709 B2 | 5/2006 | Bruce et al. |
| 2004/0047726 A1 | 3/2004 | Morrison |
| 2015/0345308 A1 | 12/2015 | Roberts, Jr. et al. |
| 2016/0097303 A1* | 4/2016 | Baldiga ................... F01D 11/12 |
| | | 416/182 |
| 2016/0348528 A1* | 12/2016 | Vetters .................. F01D 25/246 |
| 2017/0044921 A1* | 2/2017 | Vetters .................. F01D 25/246 |
| 2017/0175572 A1* | 6/2017 | Vetters ..................... F01D 25/12 |
| 2018/0195403 A1* | 7/2018 | Kerns ..................... F01D 11/08 |

FOREIGN PATENT DOCUMENTS

| JP | 10-103011 A | 4/1998 |
| JP | 2015-227661 A | 12/2015 |

* cited by examiner

*Primary Examiner* — Igor Kershteyn
(74) *Attorney, Agent, or Firm* — Xsensus LLP (57) ABSTRACT

A shroud assembly of a gas turbine includes a holder including an insertion hole, a plate-shaped shroud main body covering the holder from a radially inner side and made of a ceramic matrix composite, and a plate-shaped insertion member made of the ceramic matrix composite. The shroud main body includes a main body portion, a flange portion, and an insertion hole formed at the main body portion. The insertion member includes an insertion portion inserted into the insertion hole of the shroud main body and the insertion hole of the holder in an axial direction, and a head portion arranged at the radially inner side of the flange portion of the shroud main body and configured to be brought into contact with the flange portion from the radially inner side.

20 Claims, 5 Drawing Sheets

SHROUD ASSEMBLY OF GAS TURBINE

CROSS-REFERENCES TO RELATED APPLICATIONS

The present application is a bypass continuation of and claims priority to PCT/JP2018/018323 filed on May 11, 2018, which is incorporated herein by reference.

TECHNICAL FIELD

The present invention relates to a shroud assembly attached to a support to cover an inner peripheral surface of the support, the support being provided at a radially inner side of a casing of a gas turbine along a circumferential direction of the casing.

A functional part or structure arranged at an outer peripheral portion of a moving blade of a gas turbine and configured to properly keep a gap at a tip end of the moving blade is typically called a shroud. In the gas turbine, the shroud of the turbine is to have very high heat resistance. Proposed as one of solutions to this is the use of a ceramic matrix composite (CMC) having higher heat resistance than metal materials.

CITATION LIST

Patent Literature

PTL 1: U.S. Patent Application Publication No. 2004/47726, Specification
PTL 2: Japanese Laid-Open Patent Application Publication No. 2015-227661
PTL 3: Japanese Laid-Open Patent Application Publication No. 10-103011
PTL 4: U.S. Pat. No. 7,044,709, Specification

SUMMARY OF INVENTION

Technical Problem

The shroud is desired to have a curved shape along an inner peripheral surface of a casing, and an attaching portion attached to a support is formed at the shroud. Therefore, the shroud has a complex three-dimensional shape. However, with the CMC having long fibers, it is difficult to form a thick complex shape while maintaining the original strength of the material. Therefore, the CMC may be formed in a simple shape (plate shape, for example).

Solution to Problem

A shroud assembly of a gas turbine according to one aspect of the present disclosure is a shroud assembly provided at a support to cover an inner peripheral surface of the support, the support being provided at a radially inner side of a casing of the gas turbine along a circumferential direction of the casing. The shroud assembly includes: a holder provided at the support and including at least one insertion hole; a plate-shaped shroud main body covering the holder from the radially inner side and made of a ceramic matrix composite, the shroud main body including a main body portion arranged at the radially inner side of the holder, at least one flange portion projecting from the main body portion in an axial direction and configured to be brought into contact with an axial end portion of an inner peripheral surface of the holder from the radially inner side, and at least one insertion hole formed at the main body portion; and at least one plate-shaped insertion member made of the ceramic matrix composite and including an insertion portion configured to be inserted into the insertion hole of the shroud main body and the insertion hole of the holder and a head portion configured to, when the insertion portion is inserted into the insertion hole of the shroud main body and the insertion hole of the holder, be arranged at the radially inner side of the flange portion of the shroud main body to be brought into contact with the flange portion from the radially inner side.

The insertion member may be made of the ceramic matrix composite.

The main body portion of the shroud main body may include a main plate portion arranged at the radially inner side of the flange portion and extending along the inner peripheral surface of the holder, and a side plate portion connecting the main plate portion to the flange portion. The side plate portion may be inclined so as to extend outward in the axial direction as the side plate portion extends from the main plate portion toward the flange portion.

The at least one flange portion may include a pair of flange portions projecting from the main body portion toward both sides in the axial direction. The at least one insertion hole of the shroud main body may include a first insertion hole provided close to one of the pair of flange portions and a second insertion hole provided close to the other of the pair of flange portions. The at least one insertion member may be inserted into the first insertion hole and the second insertion hole to be brought into contact with the pair of flange portions.

The insertion member may have a T shape when viewed from a radial direction.

The at least one insertion hole of the shroud main body may include a plurality of insertion holes lined up in the circumferential direction. The at least one insertion hole of the holder may include a plurality of insertion holes lined up in the circumferential direction. The at least one insertion member may include a plurality of insertion members. When the insertion portions of the plurality of insertion members are inserted into the plurality of insertion holes of the shroud main body and the plurality of insertion holes of the holder, the head portions of the plurality of insertion members may be located adjacent to each other and extend in the circumferential direction along the flange portion.

An axially middle portion of the main body portion of the shroud main body may have a shape that is warped outward in a radial direction. The holder may include a projecting portion projecting from the inner peripheral surface of the holder, the projecting portion being configured to press the middle portion of the main body portion inward in the radial direction.

When the insertion portion of the insertion member is inserted into the insertion hole of the shroud main body and the insertion hole of the holder, the insertion member may bend, and the head portion may press the flange portion outward in a radial direction.

The insertion member may have a flat shape. A position of the insertion hole of the shroud main body in the radial direction may be made different from a position of the insertion hole of the holder in the radial direction. When the insertion portion of the insertion member is bent by being inserted into the insertion hole of the shroud main body and the insertion hole of the holder, the head portion of the insertion member may press the flange portion outward in the radial direction.

The holder may further include a biasing member configured to bias the insertion portion of the insertion member outward in a radial direction.

The shroud assembly may further include a plate-shaped sealing member arranged at a circumferential end portion of the shroud main body and made of the ceramic matrix composite. When the sealing member overlaps with the main body portion, the sealing member may protrude from the main body portion in the circumferential direction.

A surface defining a radially outer end edge of the insertion hole of the shroud main body may be formed to be flush with a radially inner surface of the flange portion of the shroud main body.

At least one of the insertion member, the shroud main body, and the holder may include a locking portion configured to prevent the insertion member from coming out from the insertion hole of the shroud main body and the insertion hole of the holder.

The holder may include a cooling hole communicating with an internal space formed between the main body portion of the shroud main body and the holder.

The main body portion of the shroud main body may include a cooling hole which communicates with the internal space and is open on a radially inner surface of the shroud main body.

DESCRIPTION OF EMBODIMENTS

Hereinafter, embodiments will be described with reference to the drawings.

Figure 1:
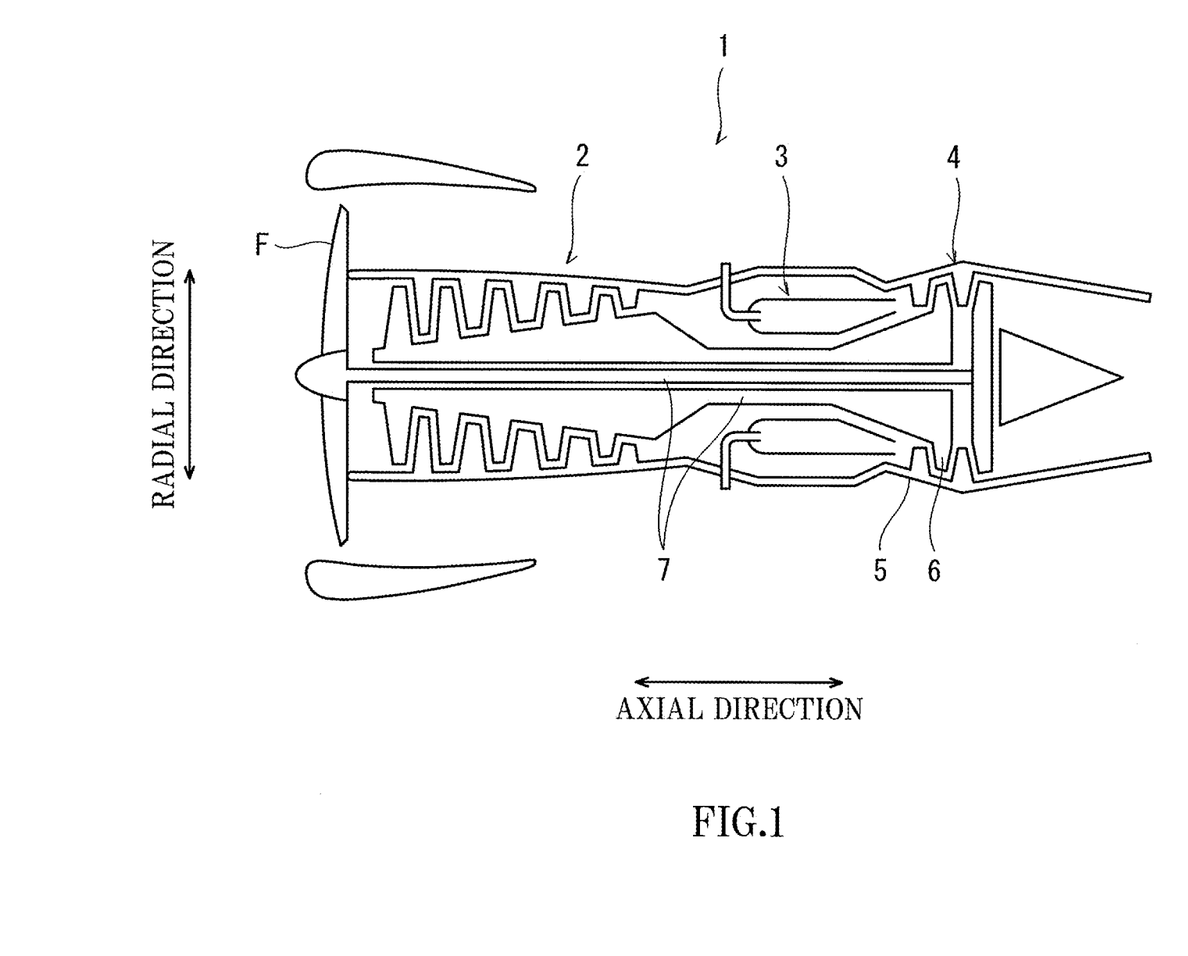
FIG. 1 is a schematic sectional view of a gas turbine at which a shroud assembly is provided.

FIG. 1 is a schematic sectional view of a gas turbine 1 at which a shroud assembly is provided. As shown in FIG. 1, in the gas turbine 1, air introduced from an outside is compressed in a compressor 2 and is then introduced to a combustor 3. A fuel is combusted in the combustor 3 together with the compressed air, and energy of the obtained high-temperature and high-pressure combustion gas is taken out as shaft torque (rotational power) in a turbine 4. The turbine 4 and the compressor 2 are coupled to each other through a rotating shaft 7, and the turbine 4 drives the compressor 2 (and a fan F). There are various types of gas turbines. For example, according to a turbo fan engine, a fan is driven mainly by power collected by a turbine, and an engine output is obtained as thrust. Such turbo fan engine is used as an aircraft engine. FIG. 1 shows the turbo fan engine that is one example of the gas turbine. However, the present invention is not limited to this.

A below-described heat-resistant shroud assembly 10 (see FIG. 2) is provided at the turbine 4. The shroud assembly 10 is arranged at an inner peripheral surface side of a cylindrical casing 5 of the turbine 4 so as to be opposed to a radially outer tip end of a moving blade 6. The gas turbine 1 may have an active clearance control function of controlling a tip clearance of the moving blade 6. There are various types of active clearance control functions. For example, the active clearance control function can be realized in such a manner that the casing 5 is forcibly contracted by spraying cooling air to an outer periphery of the casing 5 while the gas turbine 1 is driving.

Figure 2:
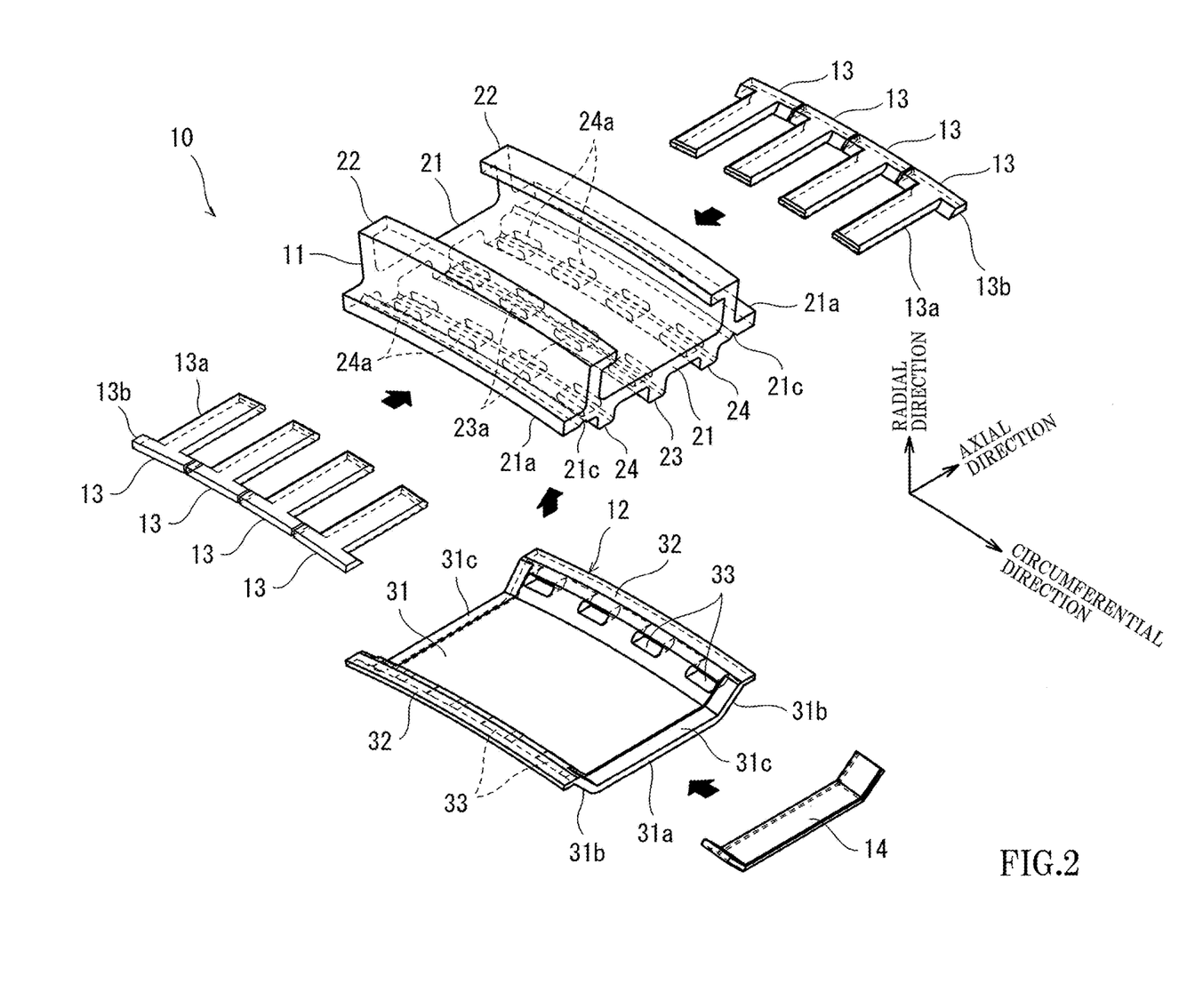
FIG. 2 is an exploded perspective view of the shroud assembly according to Embodiment 1.
Figure 3:
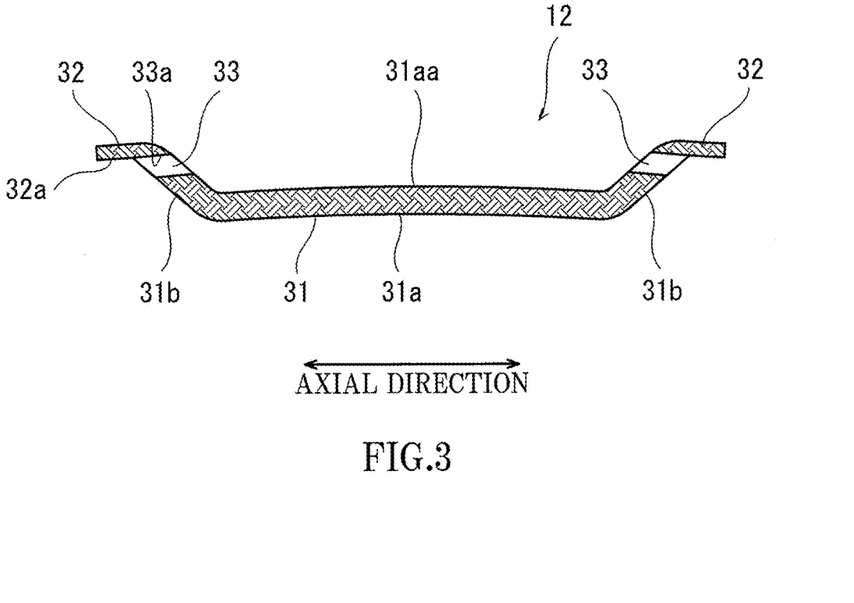
FIG. 3 is a sectional view of a shroud main body shown in FIG. 2.
Figure 4:
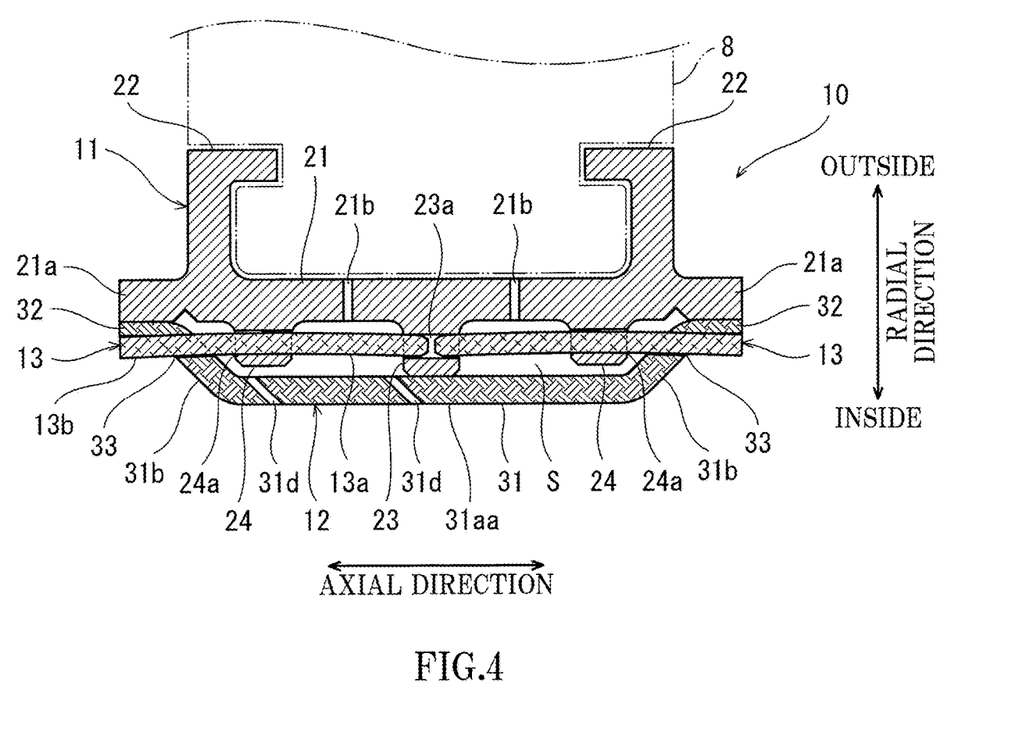
FIG. 4 is a sectional view of the shroud assembly shown in FIG. 2.
Figure 5:
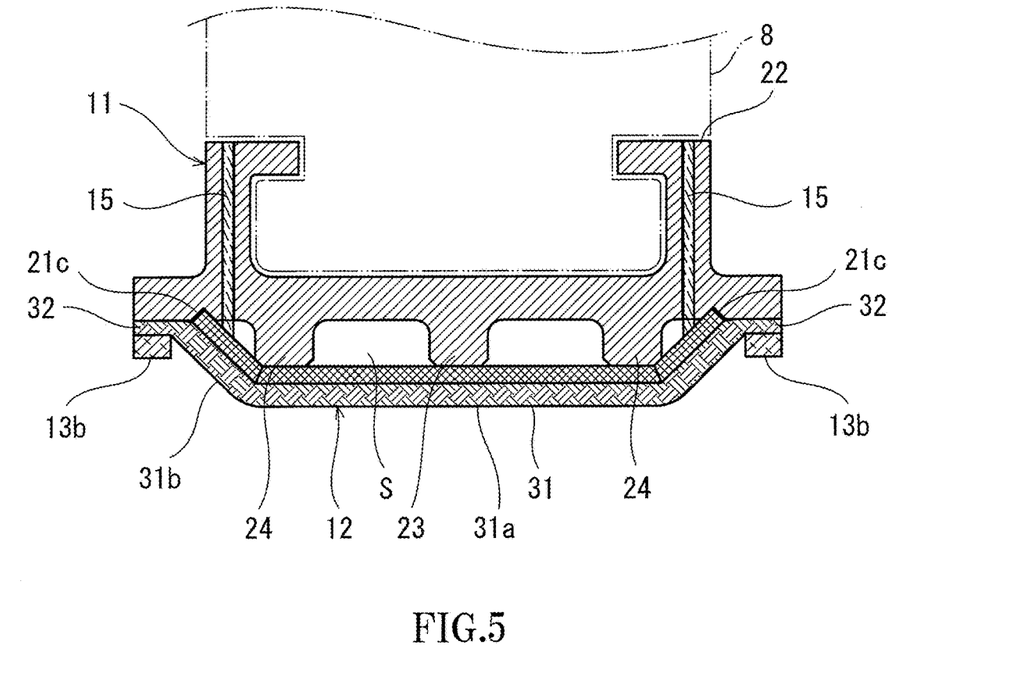
FIG. 5 is a sectional view of a circumferential end portion of the shroud assembly shown in FIG. 2.

FIG. 2 is an exploded perspective view of the shroud assembly 10 according to Embodiment 1. FIG. 3 is a sectional view of a shroud main body 12 shown in FIG. 2. FIG. 4 is a sectional view of the shroud assembly 10 shown in FIG. 2. FIG. 5 is a sectional view of a circumferential end portion of the shroud assembly 10 shown in FIG. 2. As shown in FIG. 2, the shroud assembly 10 includes a holder 11, the shroud main body 12, and a plurality of insertion members or inserts 13. In the present embodiment, a plurality of shroud assemblies 10 are prepared, and an annular shroud is constituted by arranging the plurality of shroud assemblies 10 in a circumferential direction. The holder 11 is made of metal. The shroud main body 12 and the insertion members 13 are made of a ceramic matrix composite (CMC). The CMC is prepared by, for example, impregnating silicon carbide fiber with ceramic matrix. It should be noted that the insertion member 13 is not limited to the CMC and may be formed by, for example, sticking a fireproof material, substance, or member containing the CMC or other material to a metal or coating a metal with a fireproof material, substance or member containing the CMC or other material.

The shroud assembly 10 is attached to a support 8 (see FIG. 4) so as to be hooked to the support 8 and covers an inner peripheral surface of the support 8. The support 8 is provided at an inner peripheral surface side of a portion, opposed to the moving blade 6 (see FIG. 1), of the casing 5 (see FIG. 1) of the gas turbine 1. The support 8 has a ring shape along an inner peripheral surface of the casing 5 (see FIG. 1). It should be noted that the support 8 may be integrated with the casing 5. The support 8 may be divided into plural parts in the circumferential direction.

As shown in FIGS. 2 and 4, the holder 11 includes a base portion 21, hook portions 22, a plurality of projecting portions 23 and 24, and a plurality of insertion holes 23a and 24a. The base portion 21 has a plate shape and extends in a circular-arc shape in the circumferential direction along the support 8. Each of the hook portions 22 projects from the base portion 21 outward in a radial direction and has an L shape. The holder 11 is engaged with and attached to the support 8 by the hook portions 22. It should be noted that the holder 11 does not have to be provided separately from the support 8 and may be provided integrally with the support 8. An attaching structure of attaching the holder 11 to the support 8 is not limited to this, and there are various types of attaching structures. Moreover, when the holder 11 is integrated with the support 8, the attaching structure is unnecessary.

The plurality of projecting portions 23 and 24 are located at an axially inner side of axial end portions 21a of the base portion 21, project from an inner peripheral surface of the base portion 21 inward in the radial direction, and extends in the circumferential direction. The middle projecting portion 23 projects from a middle portion of the inner peripheral surface of the base portion 21 inward in the radial direction. Each of the pair of projecting portions 24 arranged at both sides of the projecting portion 23 in an axial direction is located between the axial end portion 21a of the base portion 21 and the middle projecting portion 23 and projects from the inner peripheral surface of the base portion 21 inward in the radial direction. At circumferential end portions (portions opposed to a below-described sealing member 14 in the radial direction) of the projecting portions 23 and 24, the positions of tip ends of the projecting portions 23 and 24 in the radial direction are the same as each other (see FIG. 5). Regarding at least part of portions of the projecting portions 23 and 24 other then the circumferential end portions, a radially inner tip end of the middle projecting portion 23 is located at a radially inner side of radially inner tip ends of the projecting portions 24 located at both sides of the projecting portion 23.

It should be noted that the number of projecting portions projecting from the base portion 21 inward in the radial direction does not have to be plural and may be one. Each of the projecting portions 23 and 24 does not have to extend continuously from one circumferential end of the base portion 21 to the other circumferential end of the base portion 21 and may be divided in the circumferential direction. Moreover, projecting lengths of the projecting portions 23 and 24 may be changed. Furthermore, the projecting portions 23 and 24 do not have to be provided at the holder 11.

The plurality of insertion holes 23a and 24a are formed at the projecting portions 23 and 24 and are open in the axial direction. The plurality of insertion holes 23a are lined up in a row in the circumferential direction at the projecting portion 23, and the plurality of insertion holes 24a are lined up in a row in the circumferential direction at each projecting portion 24. It should be noted that each of the projecting portions 23 and 24 does not have to extend linearly and continuously in the circumferential direction. Each of the projecting portions 23 and 24 may be divided at an arbitrary position(s) in the circumferential direction, and the positions of divided parts of each of the projecting portions 23 and 24 may be made different from each other in the axial direction. Each of the insertion holes 23a and 24a has a shape that is long in the circumferential direction and coincides with a contour of each of insertion portions 13a of the below-described insertion members 13. It should be noted that the shapes of the insertion holes 23a and 24a are arbitrary as long as the insertion members 13 can be inserted into the insertion holes 23a and 24a. Moreover, the insertion holes (23a, 24a) into which the below-described insertion members 13 are inserted do not necessarily have to be provided at both the projecting portion 23 and the projecting portion 24. One example may be such that: the projecting portion 23 is omitted or shortened; and the insertion member 13 is inserted into the insertion holes 24a of the projecting portions 24 and contacts a radially inner end surface of the projecting portion 23. Another example may be such that: the projecting portions 24 are omitted or shortened; and the insertion member 13 is inserted into the insertion hole 23a of the projecting portion 23 and contacts radially inner end surfaces of the projecting portions 24.

As shown in FIGS. 2 to 4, the shroud main body 12 has a partially curved plate shape and covers the holder 11 from the radially inner side. The shroud main body 12 includes a main body portion 31, a pair of flange portions 32, and a plurality of insertion holes 33. The main body portion 31 is arranged at the radially inner side of the holder 11 so as to be spaced apart from the inner peripheral surface of the base portion 21 of the holder 11, and this forms an internal space S. The flange portions 32 project from both axial ends of the main body portion 31 toward both sides in the axial direction. The main body portion 31 has a concave section.

Specifically, the main body portion 31 includes a main plate portion 31a and a pair of side plate portions 31b. The main plate portion 31a is arranged at the radially inner side of the flange portions 32 and extends along an inner peripheral surface of the holder 11. The pair of side plate portions 31b connect both axial ends of the main plate portion 31a to the flange portions 32. Each of the side plate portions 31b is inclined so as to extend outward in the axial direction as it extends from the main plate portion 31a toward the flange portion 32. According to this, since the shape of a curved portion between the main plate portion 31a and the side plate portion 31b and the shape of a curved portion between the side plate portion 31b and the flange portion 32 change gently, the shroud main body 12 made of the CMC can be easily manufactured. It should be noted that an angle between the side plate portion 31b and a virtual line formed by extending the main plate portion 31a may be 30° to 90°, preferably 30° to 75°.

As shown in FIG. 3, an axially middle portion 31aa of the main plate portion 31a of the main body portion 31 of the shroud main body 12 has a shape that is warped outward in the radial direction. As shown in FIG. 2, the plurality of insertion holes 33 are formed at the side plate portions 31b of the main body portion 31 and are open in the axial direction. The plurality of insertion holes 33 are lined up in a row in the circumferential direction at each side plate portion 31b. Each of the insertion holes 33 has a shape that is long in the circumferential direction and coincides with the contour of the insertion portion 13a of the below-described insertion member 13. It should be noted that the shapes of the insertion holes 33 are arbitrary as long as the insertion members 13 can be inserted into the insertion holes 33. The insertion holes 33 of the shroud main body 12 are provided at positions overlapping with the insertion holes 23a and 24a of the holder 11 when viewed in the axial direction. It should be noted that the positions of the insertion holes 33 at one of both axial sides of the shroud main body 12 and the positions of the insertion holes 33 at the other axial side may coincide with each other in the circumferential direction or may be made different from each other in the circumferential direction, and the insertion holes 23a and 24a of the holder 11 may be provided so as to correspond to the positions of the insertion holes 33.

As shown in FIGS. 2 and 4, the shroud assembly 10 includes: the insertion members 13 inserted from one side in the axial direction into the insertion holes 33 (first insertion holes) located close to one of the flange portions 32 of the shroud main body 12; and the insertion members 13 inserted from the other side in the axial direction into the insertion holes 33 (second insertion holes) located close to the other flange portion 32 of the shroud main body 12. It should be noted that one insertion member may be inserted into the insertion hole 33 (first insertion hole) located close to one of the flange portions 32 of the shroud main body 12 and the insertion hole 33 (second insertion hole) located close to the other flange portion 32. Each insertion member 13 is formed in a flat plate shape having a normal line extending in the radial direction. The surface of the insertion member 13 is a smooth surface. The insertion members 13 has a T shape in a plan view when viewed from the radial direction. It should be noted that the shape of the insertion member 13 is not limited to this and may be, for example, a rectangular shape in a plan view.

The insertion member 13 includes the insertion portion 13a and a head portion 13b. The insertion portion 13a is inserted into the insertion holes 23a and 24a of the holder 11 and the insertion hole 33 of the shroud main body 12 in the axial direction. The head portion 13b is located outside the main body portion 31 of the shroud main body 12 in the axial direction when the insertion portion 13a is inserted into the insertion holes 23a, 24a, and 33. It should be noted that at least part of the head portion 13b is only located outside the main body portion 31 in the axial direction, and the position of the head portion 13b in the axial direction may partially overlap with the main body portion 31. When the insertion portions 13a of the insertion members 13 are inserted into the insertion holes 23a, 24a, and 33, the shroud main body 12 is positioned relative to the holder 11 by the insertion members 13, and the flange portions 32 are brought into contact with axial end portions of the inner peripheral surface of the holder 11 from the radially inner side. It should be noted that each insertion member 13 does not have to be inserted into both the insertion hole 23a and the insertion hole 24a depending on the configurations of the projecting portions 23 and 24 and the plurality of insertion holes 23a and 24a.

A surface 33a defining a radially outer end edge of the insertion hole 33 of the shroud main body 12 is formed to be flush with a radially inner surface 32a of the flange portion 32 of the shroud main body 12. Therefore, even when the insertion member 13 is flat, the head portion 13b of the insertion member 13 is brought into contact with the flange portion 32 of the shroud main body 12 from the radially inner side. To be specific, even when the insertion members 13 are formed flat, and this improves the ease of manufacture of the insertion members 13 made of the CMC, the head portions 13b of the insertion members 13 can be brought into contact with the flange portions 32 from the radially inner side, and the tight-contact state of the flange portions 32 of the shroud main body 12 with respect to the holder 11 becomes satisfactory.

The middle projecting portion 23 of the holder 11 presses the middle portion 31aa of the main plate portion 31a of the main body portion 31 of the shroud main body 12 inward in the radial direction. With this, the main plate portion 31a of the shroud main body 12 elastically deforms such that the shape of the middle portion 31aa changes from the shape that is warped outward in the radial direction to a flat shape. Thus, the shroud main body 12 is pressed against the holder 11 by its own elastic force. Therefore, a change in the inner diameter of the shroud main body 12 due to thermal distortion and vibration of the shroud main body 12 are suitably prevented. It should be noted that the main plate portion 31a of the main body portion 31 of the shroud main body 12 may have a flat shape that is not warped.

Moreover, when the insertion portions 13a of the plurality of insertion members 13 are inserted into the insertion holes 23a and 24a of the holder 11 and the insertion holes 33 of the shroud main body 12, the head portions 13b of the plurality of insertion members 13 are located adjacent to each other and extend in the circumferential direction along the flange portions 32. To be specific, the flange portions 32 of the shroud main bodies 12 are covered with the head portions 13b of the plurality of insertion members 13 entirely in the circumferential direction from the radially inner side. To be specific, since the axial end portions of the inner peripheral surface of the holder 11 are covered with both the flange portions 32 of the shroud main body 12 and the head portions 13b of the insertion members 13 in an overlapping manner, the heat deterioration of the holder 11 is satisfactorily prevented. It should be noted that the head portions 13b of the plurality of insertion members 13 may be arranged so as to be intermittently lined up in the circumferential direction.

The shroud assembly 10 is configured such that when the insertion portions 13a of the insertion members 13 are inserted into the insertion holes 23a and 24a of the holder 11 and the insertion holes 33 of the shroud main body 12, the insertion members 13 bend, and the head portions 13b press the flange portions 32 outward in the radial direction. In the present embodiment, the shapes of the flange portions 32, the shapes of the insertion members 13, the positions of the insertion holes 23a and 24a of the holder 11, and the positions of the insertion holes 33 of the shroud main body 12 are determined such that the insertion members 13 bend, and the head portions 13b press the flange portions 32 outward in the radial direction.

As one example, each of the insertion members 13 is formed in a flat shape, and the positions of the insertion holes 23a, 24a, and 33 are adjusted such that when the flange portions 32 are assembled to the holder 11, the insertion holes 33 of the shroud main body 12 are located at the radially inner side of a virtual line connecting the insertion hole 23a and the insertion hole 24a. To be specific, the insertion hole 33 overlaps with the insertion holes 23a and 24a when viewed in the axial direction but is made different in position in the radial direction from the insertion holes 23a and 24a. Therefore, when the insertion portions 13a of the insertion members 13 are inserted into the insertion holes 23a and 24a of the holder 11 and the insertion holes 33 of the shroud main body 12, the insertion members 13 bend, and the head portions 13b of the insertion members 13 press the flange portions 32 outward in the radial direction. With this, the tight-contact state of the flange portions 32 of the shroud main body 12 with respect to the holder 11 improves. In addition, the vibration and rattling of the insertion members are prevented, and the insertion members 13 are prevented from moving in the axial direction and coming off from the insertion holes 23a, 24a, and 33.

Another example may be such that: each of the insertion members 13 is not formed flat (linearly); the head portion 13b is formed in such a curved shape as to approach the flange portion 32; the flange portions 32 push and bend the head portions 13b of the insertion members 13 inward in the radial direction, and this bends the insertion members 13; and the head portions 13b of the insertion members 13 push the flange portions 32 outward in the radial direction.

Yet another example may be such that: projections projecting inward in the radial direction are provided at the flange portions 32 of the shroud main body 12; the projections push and bend the head portions 13b of the insertion members 13 inward in the radial direction, and this bends the insertion members 13; and the head portions 13b of the insertion members 13 push the flange portions 32 outward in the radial direction.

As shown in FIGS. 2 and 5, grooves 31c are formed on a radially outer surface of the main body portion 31 of the shroud main body 12. The grooves 31c extend in the axial direction and are open outward in the circumferential direction. To be specific, steps are formed at upper surfaces of both circumferential end portions of the main body portion 31 of the shroud main body 12 such that circumferential outside portions of the main body portion 31 become thin. It should be noted that the shapes of the grooves 31c are arbitrary. The shroud assembly 10 further includes a sealing member or seal 14. The sealing member 14 has a plate shape. The sealing member 14 is accommodated in one of the pair of grooves 31c of the shroud main body 12 and arranged at the circumferential end portion of the main body portion 31 so as to overlap with the shroud main body 12. It should be noted that a guide which stably holds the position of the sealing member 14 may be provided at the holder 11 without providing the grooves 31c at the shroud main body 12.

The sealing member 14 extends in the axial direction from one of ends of the main body portion 31 of the shroud main body 12 to the other end. Notch portions 21c are formed on the inner peripheral surface of the base portion 21 of the holder 11 so as to be located at positions corresponding to axially inner ends of the flange portions 32 of the shroud main body 12. Axial end edges of the sealing member 14 are fitted in the notch portions 21c. The sealing member 14 is sandwiched between the shroud main body 12 and the group of the projecting portions 23 and 24 of the holder 11. A length of the sealing member 14 in the circumferential direction (short-length direction) is longer than a length of the groove 31c of the shroud main body 12 in the circumferential direction (short-length direction). Therefore, when the sealing member 14 is accommodated in the groove 31c of the main body portion 31 of the shroud main body 12, the sealing member 14 protrudes from the main body portion 31 in the circumferential direction. This protruding portion of the sealing member 14 is accommodated in the groove 31c of the shroud main body 12 of the shroud assembly 10 located adjacently in the circumferential direction. Although not shown in FIG. 2, as shown in FIG. 5, plate-shaped sealing members or seals 15 may be provided at both sides of the holder 11 in the axial direction so as to be located between the holders 11 adjacent to each other in the circumferential direction.

As shown in FIG. 4, cooling holes 21b are formed at the base portion 21 so as to communicate with the internal space S formed between the holder 11 and the shroud main body 12. With this, a cooling fluid supplied from the support 8 side can flow through the cooling holes 21b into the internal space S and cool the holder 11, the shroud main body 12, and the insertion members 13.

Cooling holes 31d are formed at the main plate portion 31a of the main body portion 31 of the shroud main body 12 so as to communicate with the internal space S and be open on a radially inner surface of the shroud main body 12. Each of the cooling holes 31d may be inclined so as to extend toward a downstream side in the axial direction as the cooling hole 31d extends toward the radially inner side. With this, the cooling fluid in the internal space S is injected to the radially inner side of the shroud main body 12, and a cooling fluid layer (cooling fluid film) can be formed on the radially inner surface of the shroud main body 12. It should be noted that the cooling holes 21b and 31d may be omitted.

When the annular shroud is constituted by arranging the plurality of shroud assemblies 10 in the circumferential direction, gaps each between the shroud main bodies adjacent to each other in the circumferential direction are closed by the sealing members 14 and 15. With this, the cooling air can be supplied to portions by securing the pressure of the cooling air, and the flow-in of a mainstream gas can be prevented. Moreover, when the inner diameter of the casing 5 (see FIG. 1) changes by the active clearance control function, the support 8 (see FIG. 5) is also displaced in the radial direction in association with the change. For example, even when the support 8 is displaced outward in the radial direction, and the gaps each between the shroud main bodies 12 of the shroud assemblies 10 adjacent to each other in the circumferential direction change, the gaps are maintained to be closed by the sealing members 14.

According to the above configuration, each of the shroud main body 12, the insertion member 13, and the sealing member 14 has a thin plate shape, i.e., a simple shape. Therefore, even when the shroud main body 12, the insertion member 13, and the sealing member 14 are made of the CMC having a long fiber shape, satisfactory manufacturability can be realized. Moreover, since the holder 11 is made of metal, the holder can be easily manufactured even when the holder 11 has a complex shape. In addition, since the shroud main body 12 made of the CMC covers the holder 11 from the radially inner side, the holder 11 can be protected from heat. Moreover, the head portion 13b of the insertion member 13 which fixes the shroud main body 12 to the holder 11 is exposed to an outside of the shroud main body 12. However, according to the configuration in which the cooling fluid is supplied to the internal space S, the head portion 13b can be effectively cooled by the cooling fluid leaking from the gap between the insertion member 13 and the insertion hole 33. Furthermore, when the insertion members 13 are made of the CMC, the cooling fluid can be significantly reduced, or the cooling fluid can be made unnecessary.

Moreover, the head portions 13b of the insertion members 13 contact and press, from the radially inner side, the flange portions 32 of the shroud main body 12 contacting the holder 11 from the radially inner side. Therefore, the shroud main body tightly contacts the holder, and the secure positioning of the shroud main body 12 and the prevention of the vibration are realized. In addition, the stabilization of the tip clearance can be realized. Then, since the insertion members 13 contact not only the peripheral edges of the insertion holes 33 of the shroud main body 12 but also the flange portions 32, the contact area of the insertion members 13 increases, and therefore, load concentration by the contact can be suppressed. In addition, since the contact load acts in a direction perpendicular to the thickness of the shroud main body 12 and the thickness of the insertion member 13, the members made of the CMC are easily secured.

Embodiment 2

Figure 6:
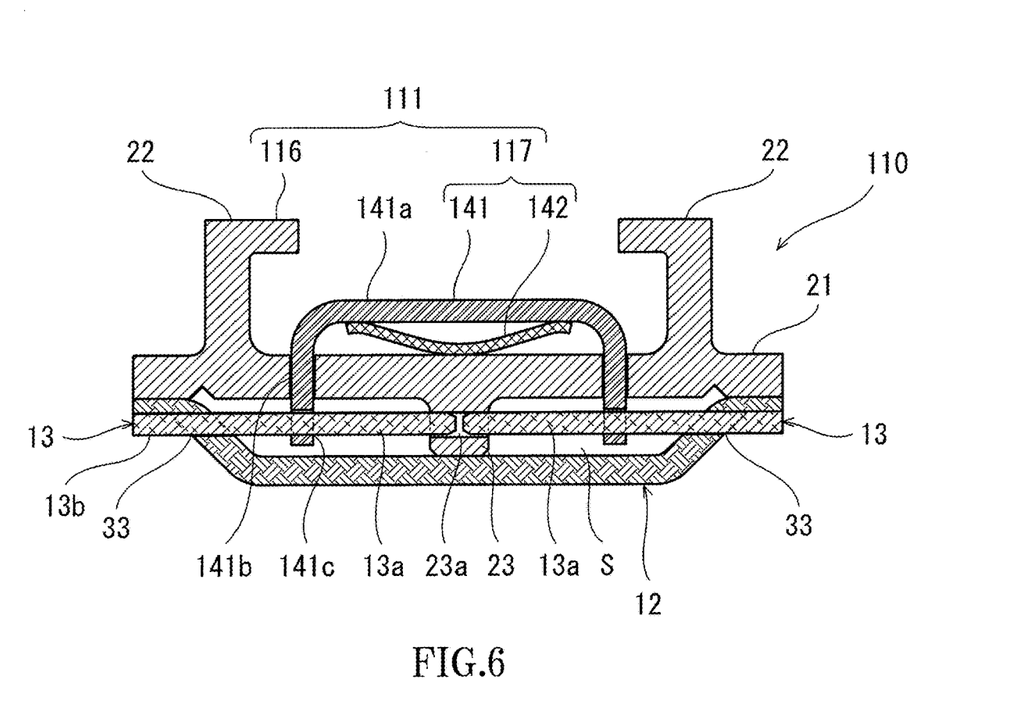
FIG. 6 is a sectional view of the shroud assembly according to Embodiment 2.

FIG. 6 is a sectional view of a shroud assembly 110 according to Embodiment 2. It should be noted that the same reference signs are used for the same components as in Embodiment 1, and explanations thereof are omitted. As shown in FIG. 6, in the shroud assembly 110 of Embodiment 2, a holder 111 includes a holder main body 116 and a biasing member, bias device, or bias system 117. The biasing member 117 biases the insertion portions 13a of the insertion members 13 outward in the radial direction. The holder main body 116 includes the base portion 21, the hook portions 22, the projecting portion 23, and the insertion holes 23a. It should be noted that the holder main body 116 does not have to include the insertion holes 23a.

The biasing member 117 includes a frame member or frame 141 and a spring 142. The frame member 114 penetrates the base portion 21 of the holder 11 from a radially outer side to a radially inner side. The spring 142 biases the frame member 141 outward in the radial direction. For example, the frame member 141 is a concave member or has a concave shape and includes a first plate portion 141a and a pair of second plate portions 141b. The first plate portion 141a extends in the axial direction. The pair of second plate portions 141b project inward in the radial direction from both sides of the first plate portion 141a in the axial direction. The first plate portion 141a is arranged at the radially outer side of the base portion 21, and the second plate portions 141b penetrate the base portion 21 toward the internal space S. Insertion holes 141c that are open in the axial direction are formed at portions of the second plate portions 141b which portions are arranged in the internal space S.

The insertion portion 13a of the insertion member 13 which has inserted into the insertion hole 33 of the shroud main body 12 is inserted into the insertion hole 141c of the frame member 141. The spring 142 is sandwiched between the base portion 21 and the first plate portion 141a of the frame member 141 in a bent state. The spring 142 biases the frame member 141 outward in the radial direction to bias the insertion members 13 outward in the radial direction. A position where the insertion member 13 is biased outward in the radial direction by the frame member 141 is preferably set at a middle portion between one end portion and the other end portion of the insertion portion 13a. With this, the tight-contact state of the shroud main body 12 with respect to (the holder main body 116 of) the holder 111 improves. In addition, the vibration and rattling of the insertion members are prevented, and the insertion members 13 are prevented from moving in the axial direction. It should be noted that since the other components are the same as those in Embodiment 1, explanations thereof are omitted.

It should be noted that the biasing member 117 is to bias the insertion member 13 outward in the radial direction, although biasing in other directions are possible. The biasing member 117 is not limited to the above configuration, and various configurations are adoptable. For example, instead of the configuration in which the insertion member 13 penetrates the biasing member 171, the biasing member may be directly attached to the insertion member 13, or the biasing member may bias the insertion member 13 through an interposed member. Moreover, the frame member 141 may be divided into L-shaped half-frame members, and the half-frame members may respectively bias the insertion members 13.

Embodiment 3

Figure 7:
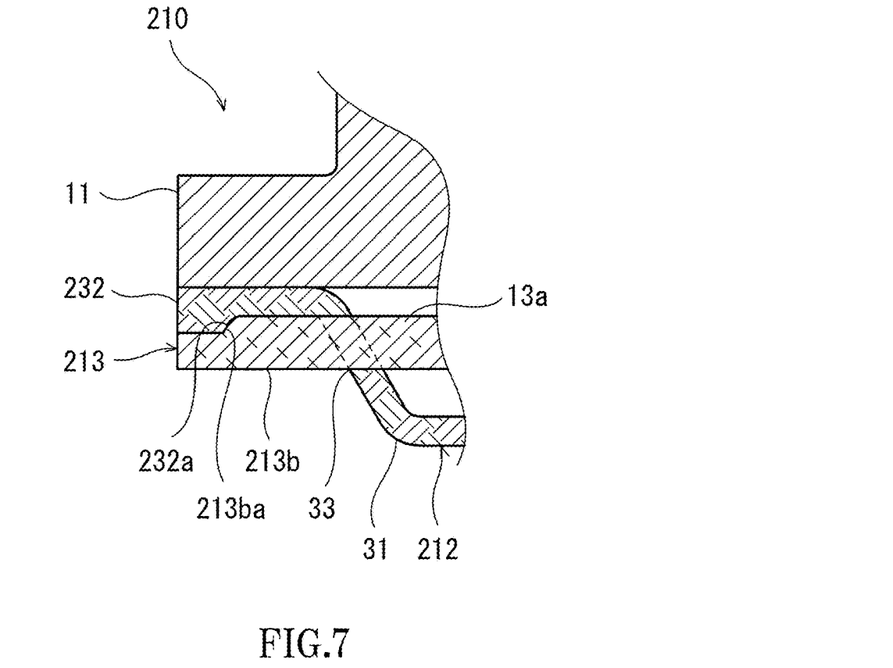
FIG. 7 is a sectional view of major components of the shroud assembly according to Embodiment 3.

FIG. 7 is a sectional view of major components of a shroud assembly 210 according to Embodiment 3. It should be noted that the same reference signs are used for the same components as in Embodiment 1, and explanations thereof are omitted. As shown in FIG. 7, a step-shaped locking portion 232a is provided on a radially inner surface of a flange portion 232 of a shroud main body 212 so as to project inward in the radial direction. The locking portion 232a is formed such that an axial end portion of the flange portion 232 projects inward in the radial direction. In the shroud assembly 210 of Embodiment 3, a step-shaped locked portion 213ba to which the locking portion 232a is locked is provided on a radially outer surface of a head portion 213b of an insertion member 213. The locking portion 213ba is configured to be unlocked from the locked portion 232a by bending the head portion 213b of the insertion member 213 inward in the radial direction and moving the insertion member 213.

Since the locking portion 213ba of the insertion member 213 is locked to the locked portion 232a of the flange portion 232, it is possible to suitably prevent a case where the insertion member 213 is displaced in the axial direction by vibration and therefore comes out from the insertion hole (not shown) of the holder 11 and the insertion hole 33 of the shroud main body 212. It should be noted that the configuration of the locking portion is not limited to this, and various configurations are adoptable. For example, the flange portion 232 may extend outward in the axial direction beyond the insertion member 213, and a locking portion 213a may be provided thereat. In this case, an axial end surface of the insertion member may serve as the locked portion of the insertion member. Moreover, the locking portion does not have to be provided at the shroud main body 212 and may be provided at the holder 11 or the insertion member 213. Furthermore, the locking portion may not be provided so as to correspond to an end portion of the insertion member 13 and may be provided at a middle portion of the insertion member 13. Since the other components are the same as those in Embodiment 1 or 2, explanations thereof are omitted.

Embodiment 4

Figure 8:
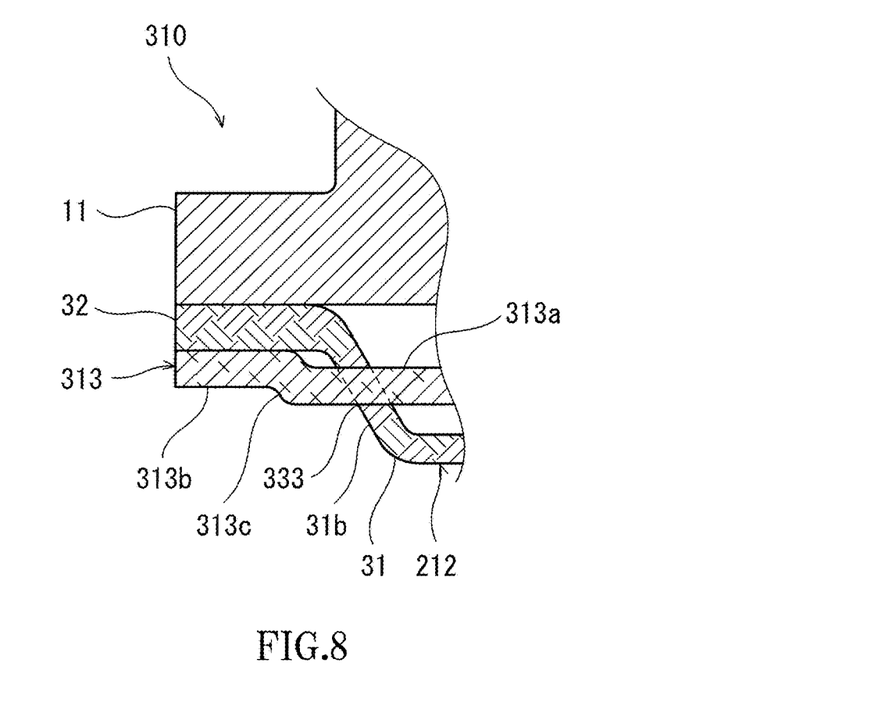
FIG. 8 is a sectional view of major components of the shroud assembly according to Embodiment 4.

FIG. 8 is a sectional view of major components of a shroud assembly 310 according to Embodiment 4. It should be noted that since the other components are the same as those in Embodiment 1, explanations thereof are omitted. As shown in FIG. 8, in the shroud assembly 310 of Embodiment 4, an insertion hole 333 provided at the side plate portion 31b of the main body portion 31 of a shroud main body 312 is arranged away from the radially inner surface of the flange portions 32 inward in the radial direction. An insertion member 313 includes an insertion portion 313a and a head portion 313b. The insertion portion 313a is inserted into the insertion hole 333. When the insertion portion 13a is inserted into the insertion hole 333, the head portion 313b is arranged outside the main body portion 31 of the shroud main body 312 in the axial direction. A step portion 313c is provided between the insertion portion 313a and the head portion 313b such that a radially outer surface of the head portion 313b is arranged at the radially outer side of a radially outer surface of the insertion portion 313a. According to this configuration, the insertion hole 333 of the shroud main body 312 does not have to be flush with a flange surface, and therefore, the positional accuracy of the insertion hole 333 can be eased. It should be noted that the other components are the same as those in Embodiment 1, 2, or 3, explanations thereof are omitted.

According to an aspect of the disclosure, since each of the shroud main body and insertion member made of the ceramic matrix composite (hereinafter referred to as CMC) can be formed in a simple shape, the ease of manufacture of the members made of the CMC can be improved. Moreover, since the holder does not have to be made of the CMC, the holder can be easily manufactured even when the holder has a complex shape. In addition, since the shroud main body made of the CMC covers the holder from the radially inner side, the holder can be protected from heat. Further, the head portion of the insertion member contacts, from the radially inner side, the flange portion of the shroud main body contacting the holder from the radially inner side. Therefore, the shroud main body tightly contacts the holder, and the secure positioning the shroud main body and the prevention of the vibration are realized. In addition, the stabilization of the tip clearance can be realized. Then, since the insertion member contacts not only the peripheral edge of the insertion hole of the shroud main body but also the flange portion, the contact area of the insertion member increases, and therefore, load concentration by the contact can be suppressed. In addition, since the contact load acts in a direction perpendicular to the thickness of the member made of the CMC, the strength of the member made of the CMC is easily secured.

According an aspect of the disclosure, the insertion member is made of the CMC. Therefore, even when the head portion of the insertion member which fixes the shroud main body to the holder is exposed to an outside of the shroud main body, the heat deterioration of the insertion member can be prevented.

According an aspect of the disclosure, since the shape of a curved portion between the main plate portion and the side plate portion and the shape of a curved portion between the side plate portion and the flange portion change gently, the ease of manufacture of the shroud main body made of the CMC can be further improved.

According to an aspect of the disclosure, the pair of flange portions of the shroud main body tightly contact the holder, and the secure positioning of the shroud main body and the prevention of the vibration can be stably realized.

According to an aspect of the disclosure, since the axial end portion of the inner peripheral surface of the holder is covered with both the flange portion of the shroud main body and the head portion of the insertion member in an overlapping manner, the heat deterioration of the holder can be further suitably prevented.

According to an aspect of the disclosure, since the entire flange portion of the shroud main body is continuously covered with the head portions of the plurality of insertion members, the axial end portion of the holder can be entirely protected from heat by the flange portion of the shroud main body and the head portions of the insertion members.

According to an aspect of the disclosure, since the projecting portion of the holder presses the middle portion of the main body portion of the shroud, a change in the inner diameter of the shroud due to thermal distortion and vibration of the shroud main body can be further suitably prevented.

According to an aspect of the disclosure, the tight-contact state of the shroud main body with respect to the holder improves. In addition, the vibration and rattling of the insertion member are prevented, and the insertion member can be prevented from moving in the axial direction.

According to an aspect of the disclosure, even when the insertion member has a flat shape, the tight-contact state of the shroud main body with respect to the holder can be improved only by adjusting the positions of the insertion holes. In addition, the vibration and rattling of the insertion member are prevented, and the insertion member can be prevented from moving in the axial direction.

According an aspect of the disclosure, the tight-contact state of the shroud main body with respect to the holder improves. In addition, the vibration and rattling of the insertion member are prevented, and the insertion member can be prevented from moving in the axial direction.

According to an aspect of the disclosure, when an annular shroud is constituted by arranging the plurality of shroud assemblies in the circumferential direction, gaps each between the shroud main bodies adjacent to each other in the circumferential direction are closed by the sealing members. With this, the cooling air can be supplied to portions by securing the pressure of the cooling air, and the flow-in of a mainstream gas can be prevented.

According to an aspect of the disclosure, the insertion member made of the CMC is formed flat, and this improves the ease of manufacture of the insertion member. In addition, the head portion of the insertion member can be brought into contact with the flange portion from the radially inner side.

According to an aspect of the disclosure, the falling out of the insertion member due to vibration or thermal distortion can be surely prevented.

According to an aspect of the invention, the holder, the shroud main body, and the insertion member can be suitably protected from heat.

According to an aspect of the disclosure, a cooling fluid layer can be formed on a radially inner surface of the shroud assembly.

According to an aspect of the disclosure, improvement of the heat resistance of the shroud, improvement of the ease of manufacture of the members made of the CMC, and stabilization of the tip clearance can be suitably realized.

REFERENCE SIGNS LIST 1 gas turbine
5 casing
8 support
10, 110, 210, 310 shroud assembly
11, 111 holder
12, 212, 312 shroud main body
13, 113, 213, 313 insertion member
13a, 313a insertion portion
13b, 213b, 313b head portion
14 sealing member
21b cooling hole
23, 24 projecting portion
23a, 24a, 141c insertion hole
31 main body portion
31a main plate portion
31aa middle portion
31b side plate portion
31c groove
31d cooling hole
32 flange portion
33 insertion hole
117 biasing member
213ba locking portion
S internal space

The invention claimed is:

1. A shroud assembly for a gas turbine, the shroud assembly for attachment to a support to cover an inner peripheral surface of the support, the support being at a radially inner side of a casing of the gas turbine along a circumferential direction of the gas turbine, the shroud assembly comprising:
a holder at the support and including at least one insertion hole;
a shroud main body covering the holder from the radially inner side, the shroud main body including
a main body portion at the radially inner side of the holder,
at least one flange portion projecting from the main body portion in an axial direction and to be brought into contact with an axial end portion of an inner peripheral surface of the holder from the radially inner side, and
at least one insertion hole at the main body portion; and
at least one insertion structure including
an insertion portion to be inserted into the insertion hole of the shroud main body and the insertion hole of the holder and
a head portion, when the insertion portion is inserted into the insertion hole of the shroud main body and the insertion hole of the holder, at the radially inner side of the flange portion of the shroud main body to be brought into contact with the flange portion from the radially inner side.

2. The shroud assembly according to claim 1, wherein the at least one insertion structure includes a ceramic matrix composite.

3. The shroud assembly according to claim 1, wherein:
the main body portion of the shroud main body includes
a main plate portion at the radially inner side of the flange portion and extending along the inner peripheral surface of the holder, and
a side plate portion connecting the main plate portion to the flange portion; and
the side plate portion is inclined so as to extend outward in the axial direction as the side plate portion extends from the main plate portion toward the flange portion.

4. The shroud assembly according to claim 1, wherein:
the at least one flange portion comprises a pair of flange portions projecting from the main body portion toward both sides in the axial direction;
the at least one insertion hole of the shroud main body includes
a first insertion hole corresponding to one of the pair of flange portions, and
a second insertion hole corresponding to the other of the pair of flange portions; and
the at least one insertion structure is in the first insertion hole and in the second insertion hole to be brought into contact with the pair of flange portions.

5. The shroud assembly according to claim 1, wherein the at least one insertion structure has a T shape when viewed from a radial direction.

6. The shroud assembly according to claim 5, wherein:
the at least one insertion hole of the shroud main body comprises a plurality of insertion holes lined up in the circumferential direction;
the at least one insertion hole of the holder comprises a plurality of insertion holes lined up in the circumferential direction;
the at least one insertion structure comprises a plurality of insertion structures; and
when the insertion portions of the plurality of insertion structures are inserted into the plurality of insertion holes of the shroud main body and the plurality of insertion holes of the holder, the head portions of the plurality of insertion structures are located adjacent to each other and extend in the circumferential direction along the flange portion.

7. The shroud assembly according to claim 1, wherein:
an axially middle portion of the main body portion of the shroud main body has a shape that is warped outward in a radial direction; and
the holder includes a projecting portion projecting from the inner peripheral surface of the holder, the projecting portion being configured to press the middle portion of the main body portion inward in the radial direction.

8. The shroud assembly according to claim 1, wherein when the insertion portion of the insertion structure is inserted into the insertion hole of the shroud main body and the insertion hole of the holder, the insertion structure bends, and the head portion presses the flange portion outward in a radial direction.

9. The shroud assembly according to claim 8, wherein:
the insertion structure has a flat shape;
a position of the insertion hole of the shroud main body in the radial direction is made different from a position of the insertion hole of the holder in the radial direction; and
when the insertion portion of the insertion structure is bent by being inserted into the insertion hole of the shroud main body and the insertion hole of the holder, the head portion of the insertion structure presses the flange portion outward in the radial direction.

10. The shroud assembly according to claim 1, wherein the holder further includes a biasing structure to bias the insertion portion of the insertion structure outward in a radial direction.

11. The shroud assembly according to claim 1, further comprising:
a plate-shaped seal at a circumferential end portion of the shroud main body and including a ceramic matrix composite,
wherein when the seal overlaps with the main body portion, the seal protrudes from the main body portion in the circumferential direction.

12. The shroud assembly according to claim 1, wherein a surface defining a radially outer end edge of the insertion hole of the shroud main body is flush with a radially inner surface of the flange portion of the shroud main body.

13. The shroud assembly according to claim 1, wherein at least one of the insertion structure, the shroud main body, and the holder includes a locking portion to prevent the insertion structure from coming out from the insertion hole of the shroud main body and the insertion hole of the holder.

14. The shroud assembly according to claim 1, wherein the insertion structure is plate shaped.

15. The shroud assembly according to claim 1, wherein the shroud main body is plate shaped.

16. The shroud assembly according to claim 1, wherein the shroud main body includes a ceramic matrix composite.

17. A system, comprising:
the shroud assembly of claim 1;
the support;
the casing; and
the gas turbine.

18. A shroud assembly for a gas turbine, comprising:
a holder including at least one insertion hole;
a shroud main body covering the holder from a radially inner side and including a ceramic matrix composite, the shroud main body including
a main body portion at the radially inner side of the holder,
at least one flange portion projecting from the main body portion in an axial direction and to be brought into contact with an axial end portion of an inner peripheral surface of the holder from the radially inner side, and
at least one insertion hole at the main body portion; and
at least one insertion structure including
an insertion portion to be inserted into the insertion hole of the shroud main body and the insertion hole of the holder and
a head portion, when the insertion portion is inserted into the insertion hole of the shroud main body and the insertion hole of the holder, at the radially inner side of the flange portion of the shroud main body to be brought into contact with the flange portion from the radially inner side.

19. The shroud assembly according to claim 18, wherein the at least one insertion structure includes the ceramic matrix composite.

20. The shroud assembly according to claim 18, wherein:
the main body portion of the shroud main body includes
a main plate portion at the radially inner side of the flange portion and extending along the inner peripheral surface of the holder, and a side plate portion connecting the main plate portion to the flange portion; and the side plate portion is inclined so as to extend outward in the axial direction as the side plate portion extends from the main plate portion toward the flange portion.

* * * * *